United States Patent [19]

Byer et al.

[11] Patent Number: 5,036,220
[45] Date of Patent: Jul. 30, 1991

[54] NONLINEAR OPTICAL RADIATION GENERATOR AND METHOD OF CONTROLLING REGIONS OF FERROELECTRIC POLARIZATION DOMAINS IN SOLID STATE BODIES

[75] Inventors: Robert L. Byer, Stanford; Martin M. Fejer; Eric J. Lim, both of Menlo Park, all of Calif.

[73] Assignee: Leland Stanford Junior University, Stanford, Calif.

[21] Appl. No.: 511,547

[22] Filed: Apr. 20, 1990

Related U.S. Application Data

[62] Division of Ser. No. 305,215, Feb. 1, 1989.

[51] Int. Cl.$^5$ .............................................. H03F 7/00
[52] U.S. Cl. ................................... 307/427; 307/430; 350/96.12; 372/22
[58] Field of Search ............... 307/424, 425, 427, 430; 350/96.11, 96.12, 96.13, 96.14; 372/7, 21, 22

[56] References Cited

U.S. PATENT DOCUMENTS

| 3,970,959 | 7/1976 | Wang et al. | 372/96 |
| 4,236,785 | 12/1980 | Papuchon et al. | 350/96.14 |
| 4,739,507 | 4/1988 | Byer et al. | 372/22 |
| 4,778,234 | 10/1988 | Papuchon et al. | 350/96.12 |
| 4,856,006 | 8/1989 | Yano et al. | 372/22 |
| 4,865,406 | 9/1989 | Klanarian et al. | 350/96.12 |

OTHER PUBLICATIONS

Tohmon, et al., "Blue Light Source Using Guided-Wave Frequency Doubler with a Diode Laser", SPIE vol. 898 Miniature Optics and Lasers (1988), pp. 70–75.
McMullen, J. D., "Optical Parametric Interactions In Isotropic Materials Using a Phase-Corrected Stack of Nonlinear Dielectric Plates", J. Appl. Phys., vol. 46, No. 7, Jul. 1975, pp. 3076–3081.
Feng, et al., "Enhancement of Second-Haronic Generation in LiNbO$_3$ Crystals With Periodic Laminar Ferroelectri Domains", Appl. Phys. Lett. 37(7) 1 Oct. 1980, pp. 607–609.

Stegeman, et al., "Nonlinear integrated optics", J. Appl. Phys. 58(12), 15 Dec. 1985, pp. R57–R78.
Rustagi, et al., "Optical Frequency Conversion in Quasi-Phase-Matched Stacks of Nonlinear Crystals", IEEE J. Quantum Electron., vol. QE-18, No. 6, Jun. 1982, pp. 1029–1041.
Levine, et al., "Phase-Matched Second Harmonic Generation in a Liquid-Filled Waveguide", Appl. Phys. Lett., vol. 26, No. 7, 1 Apr. 1975, pp. 375–377.
Dewey, et al., "Enhanced Nonlinear Optical Effects in Rotationally Twinned Crystals", Appl. Phys. Lett., vol. 26, No. 8, 15 Apr. 1975, pp. 442–444.
Somekh, et al., "Phase Matching By Periodic Modulation of the Nonlinear Optical Properties", Optics Communications, vol. 6, No. 3, Nov. 1972, pp. 301–304.
Armstrong, et al., "Interactions Between Light Waves in a Nonlinear Dielectric", Phys. Rev., vol. 127, No. 6, Sep. 15, 1962, pp. 1918–1939.
Jaskorzynska, et al., "Periodic Structures For Phase-Matching in Second Harmonic Generation in Titanium Lithium Niobate Waveguides", SPIE vol. 651 Integrated Optical Circuit Engineering III (1986), pp. 221–228.
Luh, et al., "Ferroelectric Domain Structures in LiNbO$_3$ Single-Crystal Fibers", J. Crystal Growth 78 (1986), pp. 135–143.
Lug, et al., "Stoichiometric LiNbO$_3$ Single-Crystal Fibers for Nonlinear Optical Applications", J. Crystal Growth 35 (1987), pp. 264–269.
Suchoski, et al., "Stable Low-Loss Proton-Exchange LiNbO$_3$ Optical Waveguide", J. Appl. Phys. 50(7), Jul. 1979, pp. 4599–4603.
Thaniyavarn, et al., "Domain Inversion Effects in Ti-

(List continued on next page.)

Primary Examiner—Frank Gonzalez
Assistant Examiner—Galen J. Hansen

[57] ABSTRACT

A nonlinear waveguiding optical converter in a solid state body. The waveguide is provided with compositionally differing region (domains) of dominant electrical polarization in succeeding regions transverse to the path of guided radiation.

7 Claims, 4 Drawing Sheets

OTHER PUBLICATIONS

-LiNbO$_3$ Integrated Optical Devices", Appl. Phys. Lett. 46(10), 15 May 1985, pp. 933-935.

Szilagi, et al., "A Quasi-Phase-Matching Technique For Efficient Optical Mixing and Frequency Doubling", J. Appl. Phys., vol. 47, No. 5, May 1976, pp. 2025-2032.

Feisst, et al., "Current Induced Periodic Ferroelectric Domain Structures in LiNbO$_3$ Applied for Efficient Nonlinear Optical Frequency Mixing", Appl. Phys. Lett., vol. 47, No. 11, 1 Dec. 1985, pp. 1125-1127.

_Fig. 5_

_Fig. 6_

NONLINEAR OPTICAL RADIATION GENERATOR AND METHOD OF CONTROLLING REGIONS OF FERROELECTRIC POLARIZATION DOMAINS IN SOLID STATE BODIES

U.S. GOVERNMENT CONTRACTS

This invention was made with government support under contracts N0014-84-K-0327 and AFOSR-88-0354 respectively awarded by the U.S. Navy and the U.S. Air Force. The U.S. government has certain rights to the invention.

This is a division of application Ser. No. 7/305,215 filed Feb. 1, 1989 and still pending.

BACKGROUND OF THE INVENTION

The present invention relates to an optical radiation generator which utilizes regions of differing states of electrical polarization in a waveguide to enhance harmonic generation and other sum or difference-frequency conversion processes of electromagnetic (EM) radiation.

Optical radiation converters, i.e., apparatuses which convert one form of energy into optical EM radiation, have long been known. One type receiving much attention is the combination of a laser diode(s) as a pumping source with a nonlinear material which converts the radiation emanating from the diode(s) to optical radiation of a desired frequency It is often desirable to optimize the power and efficiency of nonlinear frequency conversion and to increase the operating bandwidth of such arrangements.

SUMMARY OF THE INVENTION

The present invention provides a nonlinear optical generator which efficiently converts EM radiation to a desired optical frequency.

The nonlinear converter includes, from the broad standpoint, a source of electromagnetic radiation having one or more frequencies which are different than the desired optical frequency, and a solid state body within or upon which a waveguide is defined for confining electromagnetic radiation from the source and/or electromagnetic radiation having the desired frequency. In keeping with the invention, the waveguide is provided with two or more regions (domains) of different states of ferroelectric polarization transverse to the path of the radiation guided by the same, so as to convert the radiation from the source to output radiation having the desired optical frequency. (As used herein, a state, domain, or region of ferroelectric polarization is meant to be a state, domain, or region in which there is a direction of ferroelectric polarization that is dominant over others. The term "optical" as used herein to identify EM radiation or EM radiation properties, is meant to define and encompass electromagnetic radiation in the visible wavelength spectrum and in other adjacent wavelength spectrums,—typically radiation having a wavelength in the range of between 1 and 15,000 nanometers.)

Most desirably, each of the regions has a length along the path which provides quasi-phasematching (QPM) between the source radiation and the generated radiation. It has been found that quasi-phasematching can provide nonlinear conversion of EM radiation relatively efficiently to a desired optical wavelength in certain situations. For example, use of quasi-phasematching enables one to take advantage of nonlinear coefficients which are not available for use with birefringent phasematching. In some situations II it also enables one to obtain desired operating temperatures, to increase bandwidth, or even to obtain nonlinear conversion with many materials with which birefringent phasematching is not practiced.

The most desirable radiation is coherent and the regions have lengths along the radiation path which is generally equal to an odd integer multiple of the coherence length of the nonlinear interaction. (By "coherence length" is meant the distance over which the phase of the source EM field and the generated EM slip by a phase factor of 180°. The paper authored by J. D. McMullin entitled "Optical Parametric Interactions in Isotropic Materials Using a Phase-Corrected Stack of Nonlinear Dielectric Plates" appearing in the *Journal of Applied Physics*, Volume 46, No. 7 (July 1975) provides a mathematical definition and treatment of coherence length.) Such a construction optimizes conversion of the power from the incoming radiation to the outgoing radiation.

The optical converter of the invention is most desirably used to generate "blue" optical radiation, i.e., radiation having a wavelength in the range of about 390-492 nanometers, a range which encompasses visible light said to be violet in color. Radiation in this wavelength range has many applications.

There are various ways of forming a region of desired ferroelectric polarization within a solid state body already having ferroelectric polarization. One way is to vary the composition of the body so that the same will have differing compositions at differing regions. This is achieved most simply by the patterned introduction or removal of a selected material from the solid state body. Changing of polarization to provide the region also can be achieved by applying electric fields to such a solid state body. Electrodiffusion, i.e., movement within the body of materials more toward one of the electrodes than the other, often results. This is particularly true when the electric fields are applied to the body by contacting surfaces of the same with electrodes. Electrodes can act as a source of contaminating material, and the potential applied thereto can cause its migration. The introduction of contaminants in this manner into a solid state body can be particularly deleterious when the body is designed to interact with electromagnetic radiation. Electrodiffusion from the electrodes can be either avoided or taken advantage of by selecting the electrodes and the value of the potential to be applied thereto, relative to the material of the solid state body, to produce the desired electrical polarization regions. The electrodes of differing potential values used to create the electric field(s) within the body can be placed respectively on different surfaces of the body, at least one of which is spaced sufficiently far from the path of EM radiation in the body to prevent material from such electrode(s) on such surface from migrating to the radiation path.

It should be noted that the broad concept of applying electrodes to a solid state body to create regions of electrical polarization has been described previously—see, for example, the paper authored by Nakamura, et al. entitled "Poling of Ferroelectric Crystals by Using Interdigital Electrodes and its Application to Bulk-Wave Transducers" appearing in the volume entitled *Proceedings of 1983 IEEE Ultrasonics Symposium*. However, this polarization was for an ultrasonic transducer designed to propagate mechanical waves, rather than an integrated optic device designed to interact with or generate EM radiation. Also, liquid within a waveguide has been periodically poled and the second harmonic of incoming radiation has been generated therefrom—note the paper entitled "Phase-Matched Second Harmonic Generation in a Liquid Filled Waveguide" authored by Levine, et al. appearing in Volume 26, No. 7, of *Applied Physics Letters* (April 1975). It will be recognized, though, that poling within a liquid is both transitory in nature (it disappears as soon as the electric field or other mechanism responsible for the poling is removed) and is an impractical means of providing desired optical frequencies in most applications. Moreover, while it has been suggested that there be domain reversals in ferroelectric crystal waveguides, no one has been able to reduce this concept to practice. Some have obtained the domain reversals by stacking crystalline thin plates, each of which has a dominant polarization. These plates have been stacked in appropriate orientations relative to one another. An example is described in the paper by Rustagi, et al. entitled "Optical Frequency Conversion in Quasi-Phasematched Stacks of Non-Linear Crystals" appearing in the *IEEE Journal of Quantum Electronics*, Volume QE-18, No. 6 (June 1982). This approach has significant problems associated with manufacturing—the thin plates have to be quite thin (in the micron range) and their relative orientation in the stack is critical Moreover, it is difficult to achieve the necessary overall optical quality that is needed for a meaningful construction. Others have suggested growing crystals while controlling the formation of domains therein to provide periodic laminar domains Attention is directed to the Feng, et al. paper entitled "Enhancement of Second-Harmonic Generation in $LiNbO_3$ Crystals with Periodic Laminar Ferroelectric Domains" which appears in *Applied Physics Letters*, Volume 37, No. 7 (Oct. 1, 1980). This approach is impractical, primarily because of the necessity of having regions of dominant ferroelectric polarization which have critical lengths in the micron range.

The invention includes many other features and advantages which will become apparent or will be described in connection with the following description of preferred embodiments thereof.

DETAILED DESCRIPTION

Figure 1:
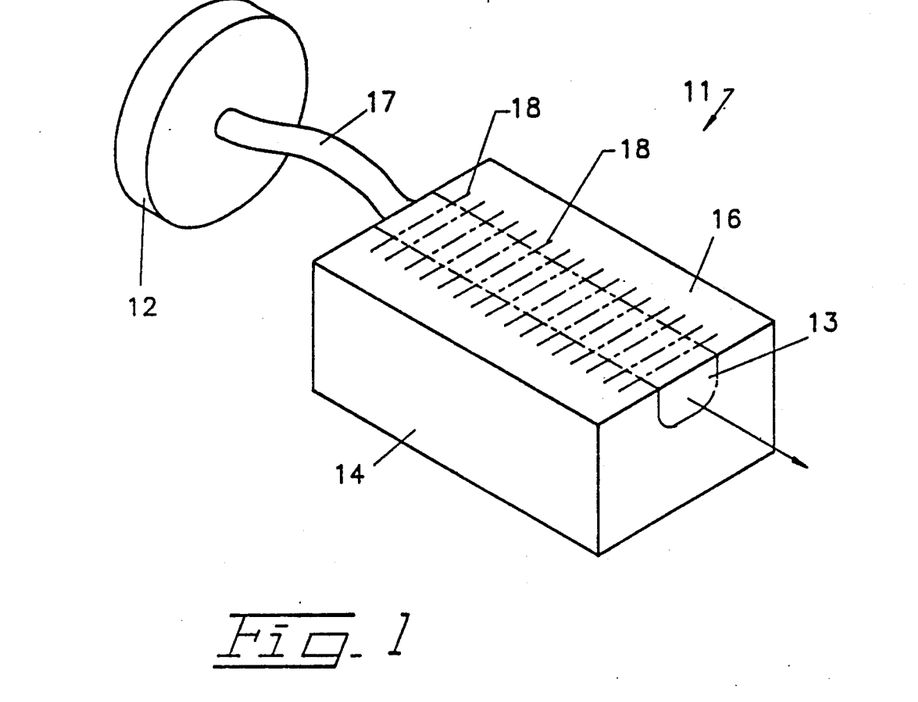
FIG. 1 is a generally schematic isometric view of a preferred embodiment of a nonlinear optical generator of the invention.
Figure 2:
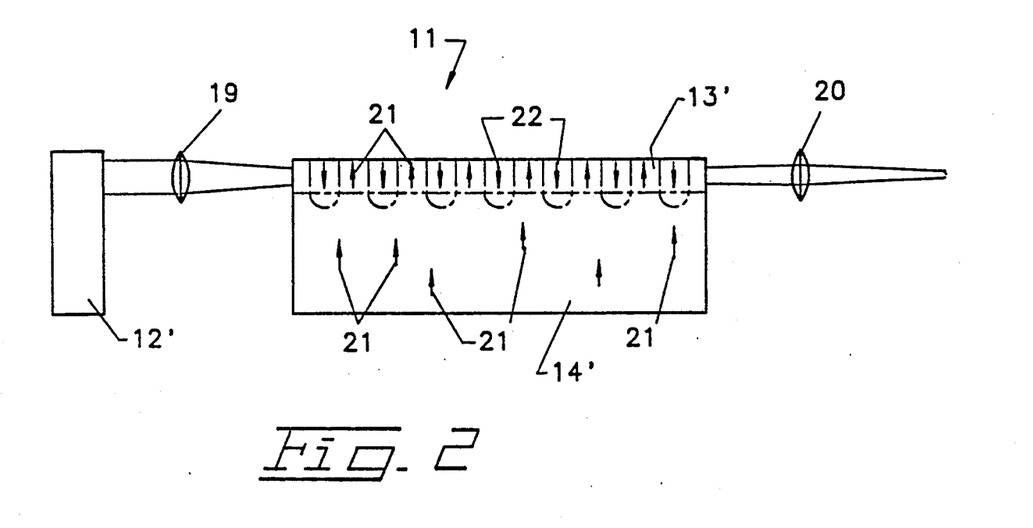
FIG. 2 is a schematic view of an optical generator illustrating features of the instant invention.

Reference is first made to FIGS. 1 and 2 which schematically illustrate a nonlinear optical generator of the present invention. Such generator, generally referred to by the reference numeral 11, comprises a source of incident coherent electromagnetic (EM) radiation having a frequency to be converted to the desired optical frequency. While the source could be one or more different devices such as a gas or solid state laser, in this embodiment it is provided by a laser diode 12. Such laser diode is tuned and otherwise controlled in a conventional manner to provide coherent EM radiation having the frequency to be converted. Such radiation is fed to a waveguide 13 formed within a solid state body 14. Such waveguide is most desirably formed at one surface, surface 16, of the solid state body since it is simpler to make the modifications necessary to provide a waveguide, e.g., change the composition of the body, and hence, its index of refraction, at a surface. The body 14 most desirably is a ferroelectric crystalline body, and the waveguide is formed as a channel. Body 14 can be a crystal of lithium niobate ($LiNbO_3$) having its spontaneous ferroelectric polarization made dominant, such as the single ferroelectric domain crystal available from Crystal Technology, Inc. of Palo Alto, Calif. under the designation Z-cut $LiNbO_3$ integrated optics substrate, and the waveguide 13 formed in the same by proton-exchange. It should be noted that the waveguide could be other kinds, such as strip loaded or ridge waveguides. Moreover, from the broad standpoint it could be formed deep within the body of the crystal, such as by post-diffusion, or on a surface of the body, such as by judicious coating.

The output of the laser diode 12 is directed to the channel waveguide by means of an optical fiber 17. It is desirable in some instances to abut a laser diode directly to a surface of the solid state body to provide coupling of its output to the waveguide defined by the same. It will be recognized that in such instances, the means for directing the output into the waveguide simply will be the mounting structure which provides such abutment in the appropriate alignment. The polarization of the incident radiation is controlled to optimize the nonlinear interaction.

In keeping with the invention, the channel waveguide is provided with a plurality of regions of differing states of dominant ferroelectric polarizations transverse to the path of the radiation guided by the same. While this plurality of regions is represented in FIG. 1 by broken lines 18, it will be recognized by those of ordinary skill in the art that such lines in the drawing do not necessarily represent visible marks on the body 14. These representations are more easily seen in the schematic representation provided by FIG. 2. Body 14 is represented at 14' having the waveguide 13 defined therein represented at 13'. Diode laser 12 is represented at 12' having its output focused as represented by lens 19, in an optimum manner to the entry end of the waveguide 13'. The radiation emanating from the waveguide is focused as represented by lens 20 for the desired application. It should be noted that although the waveguide 13 preferably is a channel, such waveguide configuration is not necessary from the broad standpoint. For example, it could have the configuration of a plane adjacent the surface 16.

The states of normal polarization within the body are represented by the arrows 21. It can be seen that the body 14' normally has a dominant state of polarization in the direction represented by such arrows. Because of this dominant electrical polarization, adjacent regions of different dominant polarization can be provided simply by changing the dominant polarization of the regions 22. That is, those regions between the regions 22 act as regions of different polarization. The invention is applicable, though, to arrangements in which the body itself is not previously provided with dominant electrical polarization. Moreover, it is not necessary that there be complete reversals in polarization between adjacent regions. That is, power can be transferred to the desired frequency by suitably selecting the length and placement of the regions having dominant polarization. It is important, though, that if the waveguide includes regions of polarization that extract power from the radiation of the desired outgoing frequency, the number of total domain reversals which result in the addition of power to such frequency be greater than the number which remove power.

The regions which are formed within the body at the waveguide are delineated by broken lines and are indicated in FIG. 2 by the reference numeral 22. As illustrated, each of such regions extends for the full depth and width (see FIG. 1) of the waveguide While such an arrangement is preferred so that the interaction between such regions and the radiation will be optimized, it is not necessary from the broad standpoint. The regions could be adjacent to the waveguide, as long as there is interaction between the radiation in the waveguide and the differently poled regions. Such an arrangement is meant to be included when it is stated in the claims that the EM radiation confined by the waveguide will traverse the regions which are formed. The body should be maintained below its Curie temperature to assure that the regions of dominant ferroelectric polarization remain in the same. (This is assuming that no external force is applied to the body to retain the polarization orientation.) It should be noted that when the domain reversal is in a liquid, there is no temperature at which one can be assured of discrete regions being provided when no external force is applied to the liquid.

Each of the regions 22 has a length selected to provide quasi-phasematching between the frequencies of the incoming and outgoing EM radiation. Most desirably, the input EM radiation is coherent and such length is generally equal to an odd integer multiple of the coherence length of the nonlinear interaction. This will optimize transfer of the power from the incoming frequency(ies) to the desired optical frequency. Although the length of the poled/counter-poled regions are shown equal in FIG. 2, it may be advantageous in certain situations to provide domains having different lengths or in which the domain periodicity varies in order to optimize the nonlinear interactions.

The simplest form of the invention is one in which the body acts as a frequency doubler, i.e., the output frequency is the second harmonic of an input frequency. It has been found that with quasi-phasematching as discussed below, a lithium niobate crystal having a waveguide for input radiation having a wavelength of 0.86 microns acts to provide an output radiation of 0.43 microns, radiation having an optical frequency within the blue light range mentioned above.

From the broad standpoint, the solid state body 14 may have other features. For example, it may be desired to provide reflective surfaces to resonate one or more frequencies of the radiation in the waveguide to enhance the conversion. Moreover, such body itself could be a lasant material and act to provide lasing to increase the power output. In such an arrangement, the regions of dominant polarity could be either inside or outside a laser cavity. In such a situation, it is not necessary that the material having the regions be a lasant material. It also should be noted that the invention is applicable to use for the solid state body of rare-earth doped ferroelectric materials.

It should be noted that as used herein, second harmonic generation (SHG) is considered simply to be a special case of sum frequency conversion. It is recognized, though, that SHG is treated mathematically differently than other sum and difference frequency conversions of EM radiation. Moreover, while the invention is described specifically in connection with the formation of enhanced SHG from a single frequency incoming radiation, it is applicable to more than one frequency of EM radiation being inputted for the generation of output radiation having the desired optical frequency.

Figure 3:
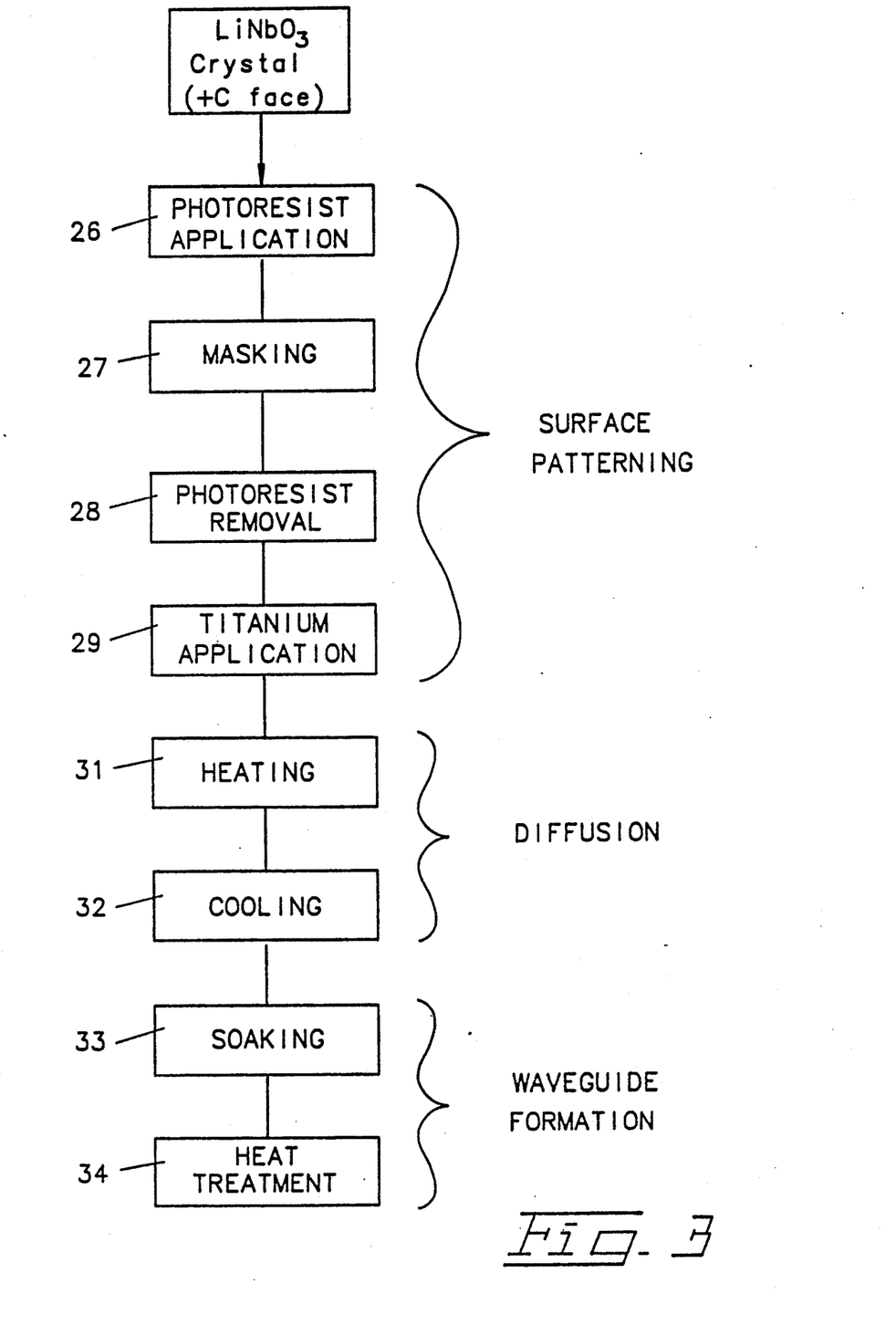
FIG. 3 is a flow diagram illustrating a preferred embodiment of the chemical poling method of the instant invention.

There are various ways in which the regions of electrical polarization can be formed. One is by altering the composition of the base material at those locations at which different electrical polarizations are desired. Most desirably, the regions of different electrical polarization are adjacent to one another. If the body is provided with a dominant electrical polarization, then it is only necessary to alter the composition of certain of the regions to be different from the composition of the body at other adjacent regions to provide the different electrical polarizations. For example, it is known that titanium diffusion into the +C surface of a lithium niobate crystalline wafer causes reversal of the dominant electrical polarization at the location of such diffusion. This effect is exploited to create regions of polarization at the surface of a lithium niobate substrate having an original dominant polarization. The surface of the same is patterned with titanium which is then diffused into the crystalline material This, plus the formation of a waveguide in the substrate, is schematically illustrated by the flow diagram of FIG. 3. Lift-off lithography is used to pattern the titanium layer. A suitable photoresist material, such as Hoechst Celanese AZ5214-E, is applied to the surface of the crystal via, for example, spinning. This application step is represented in FIG. 3, by box 26. The photoresist covered surface is then masked as represented by the block 27 and exposed to ultraviolet radiation. The exposed photoresist material is then removed as represented by block 28 from those surface areas which are not masked, with, for example, Shipley Microposit developer. A layer of titanium is then applied to the surface covering both the exposed surface of the crystalline and those areas on the surface which include the photoresist. This application is represented in the figure by block 29.

The photoresist remaining on the surface beneath areas of the titanium are then removed, resulting in portions of the titanium layer which are not adhered to the substrate and can be "lifted off". The result is that the +C face of the lithium niobate crystalline body is patterned with titanium, with the pattern coinciding on the surface with the regions of the body at which it is desired to change the composition.

The titanium is then diffused into the substrate. This is effected by heating the substrate to a temperature in the range of about 900–1200° C., maintaining such temperature for a particular period of time, and then cooling (a thermal treatment) the substrate to room temperature. It is believed that this diffusion results in a chemical change to the composition of the body, rather than simply a change in the material constituents of the regions That is, it is believed that the titanium replaces niobium in the chemical composition of the body. It should be noted, however, that a change in the material constituents in the regions also is alteration of the composition of the body, although it is not an alteration of the chemical composition of the same.

In one embodiment that has been implemented, the lithium niobate substrate was 0.5 mm thick. It was patterned with four different titanium line gratings, each of which was about 1 mm long. The periods of the gratings ranged from 15 to 22 microns. Each of the grating lines was approximately 4 microns wide and 5 nanometers thick. This experimental set up was designed to double 1.06 micron wavelength radiation, and the periods of the gratings were chosen so that the resulting polarization regions would be about 3 coherence lengths long.

The heat treatment consisted of a two-hour ramp from room temperature to a temperature of 1100° C., followed by a 30 minute soak at such temperature. Cooling was achieved merely by interrupting power to the oven which provided the heating and allowing it to cool to room temperature. This provided an initial cooling rate of 8 K per minute. These heating and cooling steps are represented in FIG. 3 by blocks 31 and 32.

To prevent outdiffusion of lithium oxide during the heating and cooling steps, the titanium coated substrate was placed in a closed alumina boat filled with congruent lithium niobate powder. A proton exchange waveguide was formed in the substrate by proton-exchange, traversing the resulting regions of dominant electrical polarization. This was achieved by soaking the solid state body in benzoic acid (high purity) at 200° C. and then heat treating it in flowing oxygen at 350° C. These steps are represented in FIG. 3 by blocks 33 and 34. The resulting waveguide had a single TM mode at 1.06 microns.

As mentioned previously, the transference of power from the incoming radiation to outgoing radiation at the desired optical frequency is most simply achieved in this specific embodiment by quasi-phasematching (QPM). While quasi-phasematching is not new per se, the following discussion will aid in an understanding of its application in the instant invention. It is believed that it will be helpful to first consider standard birefringent phasematching.

Optical second harmonic generation is possible in a medium which possesses a nonzero second-order nonlinear susceptibility. An incident fundamental wave will generate a forced wave at the second harmonic frequency via this nonlinear susceptibility which travels at the same velocity as the fundamental. If $k_1$ is the fundamental wavevector, then the forced wave will have wavevector $2k_1$. Boundary conditions imposed by Maxwell's equations require that a free second-harmonic wave with wavevector $k_2$, generated at the surface, also be present in the crystal. The second harmonic intensity in the crystal is the result of interference between these two waves. Because of dispersion in the medium, the free and forced waves will not in general travel with the same velocity—they will beat against each other, resulting in a second harmonic intensity which varies sinusoidally with distance in the crystal as power is alternately transferred from the fundamental to the second harmonic and back, with a half-period equal to the coherence length, $l_c$. This situation is illustrated by curve C in FIG. 4(a). The coherence length is given by $l_c = \pi/\Delta k$, where $\Delta k = |2k_1 - k_2|$. (In waveguides the wavevectors are replaced by mode propagation constants, but otherwise the description is qualitatively identical.) The second harmonic intensity at $z = L$ is given by $$I_{2\omega} \propto I_\omega^2 d^2 L^2 [sin^2(\Delta kL/2)/(\Delta kL/2)^2], \quad \text{[A-1]}$$

where d is the relevant effective nonlinear coefficient, which is proportional to the second-order nonlinear susceptibility. It can be seen from Eq. [A-1] that the peak intensity of the oscillating second harmonic is smaller for larger wavevector mismatch $\Delta k$. For this reason, it is desirable to arrange for $\Delta k$ to be exactly zero, a process called phasematching Under phasematched conditions, the second harmonic intensity grows monotonically with the square of the distance in the crystal, as indicated by curve A in FIG. 4(a). This condition can be met in birefringent crystals by polarizing the fundamental wave appropriately and propagating in such a direction that the orthogonally polarized second harmonic wave sees the same refractive index as the fundamental This technique is called angle-tuned or critical phasematching. If the crystal has the right amount of birefringence which can be varied sufficiently with temperature, so-called noncritical phasematching can be accomplished by temperature tuning with propagation 90° to the optical axis of the crystal.

Figure 4A:
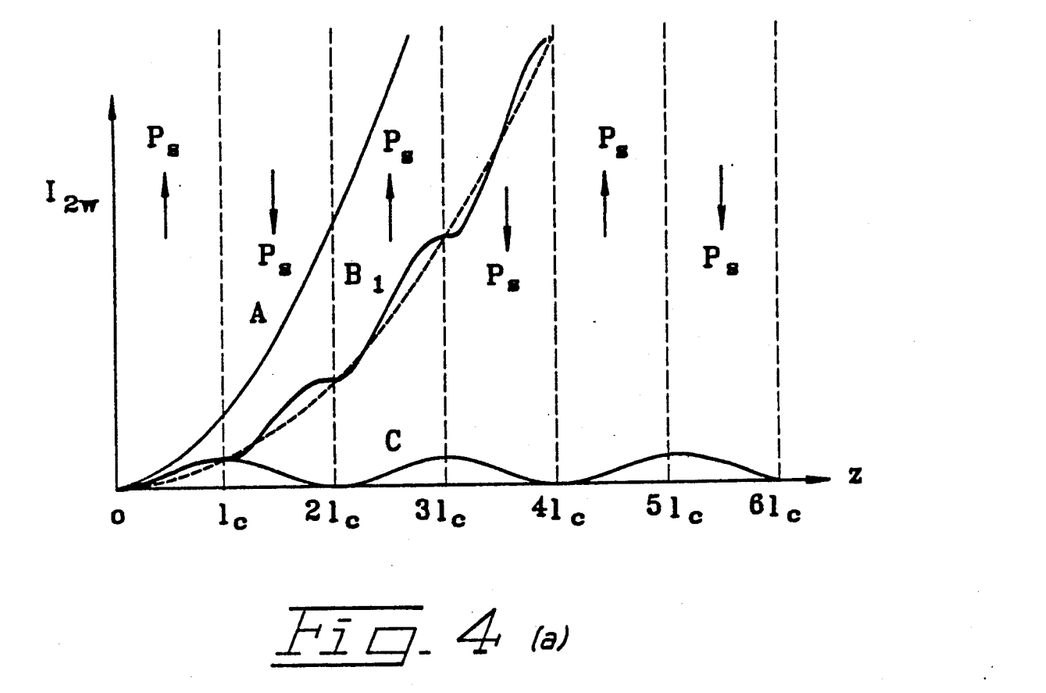
FIGS. 4(a) and 4(b) are graphical representations included to facilitate an understanding of quasi-phasematching.
Figure 4B:
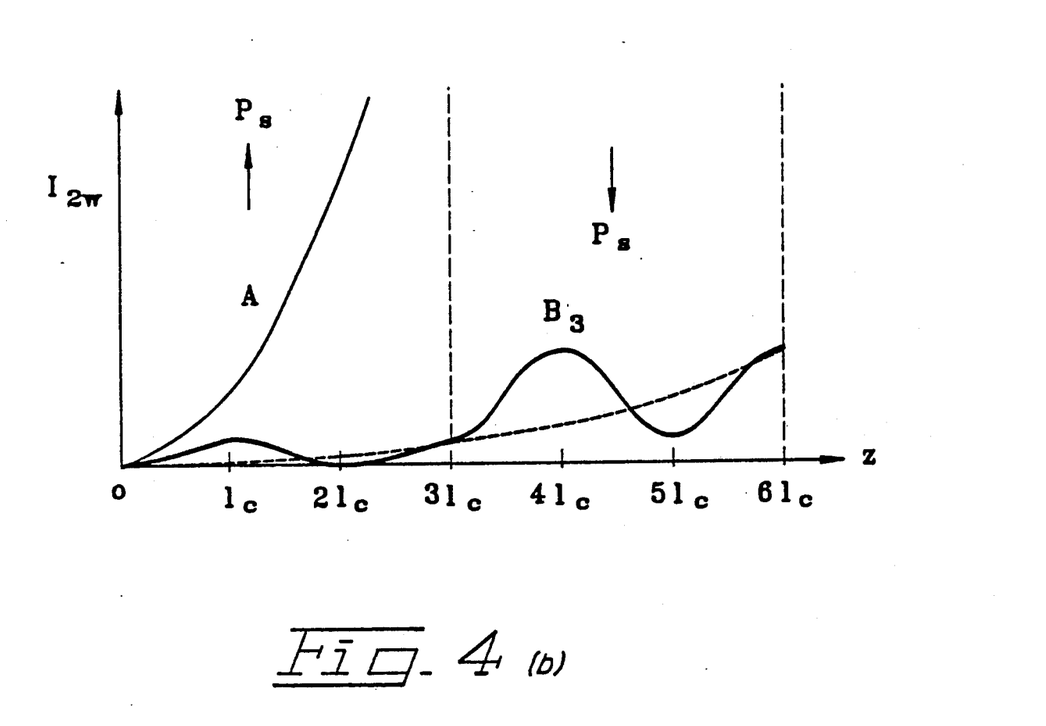

Quasi-phasematching, as an alternative to the birefringent phasematching just discussed, is illustrated by the curves labeled B in FIGS. 4(a) and 4(b). If $\Delta k \neq 0$, then the free and forced second harmonic waves accumulate a relative phase shift of $\pi$ every coherence length $l_c$. If the phase of the forced polarization wave is flipped by $\pi$ at a point where second harmonic power is beginning to get transferred to the fundamental, then instead power will continue to be coupled into the second harmonic. This can be accomplished by flipping the sign of the nonlinear coefficient d, which can occur by changing the crystal orientation abruptly In ferroelectric LiNbO$_3$, this flipping of the crystal axes can be done by changing the sign of the polarization $P_s$ within the same crystal. Maximum efficiency is obtained by changing the direction of $P_s$ every coherence length. This situation, which we shall call first-order quasi-phasematching, is shown by curve $B_1$ in FIG. 4(a). It can be shown that the second harmonic power in the quasi-phasematched case still grows with the square of the distance, but with a smaller effective nonlinear coefficient given by $2d/\pi m$, where d is the usual nonlinear coefficient, and m is the order of the period poling grating whose domain lengths are $l = ml_c$. Continual growth of the second harmonic is only obtained for odd m Third-order quasi-phasematching is illustrated by curve 3 in FIG. 4(b), which grows on the average only one-ninth as rapidly as in the first-order quasi-phasematched case, which in turn grows only $(2/\pi)^2 = 0.4$ times as rapidly as for perfect phasematching There are at least four reasons for using quasi-phasematching in spite of this apparent reduction in efficiency One may wish to use it: (1) to operate at wavelengths or in geometries or materials in which angle- or temperature-tuned birefringent phasematching is impossible; (2) to make an interaction phasematch at a desirable temperature, like room temperature; (3) to use a nonlinear coefficient which cannot be birefringently phasematched, e.g., a coefficient which couples the same polarization of fundamental and harmonic; or (4) to increase bandwidth.

Lithium niobate has three different nonlinear coefficients In deciding which coefficient to sue for second harmonic generation (SHG), it is helpful to refer to the following table.

TABLE

Nonlinear Coefficients of $LiNbO_3$

| Coefficient | Relative Magnitude | $l_c$ in μm at T = 25° C. | | |
|---|---|---|---|---|
| | | $\lambda = 1.32$ μm | $\lambda = 1.06$ μm | $\lambda = 0.86$ μm |
| $d_{15}(=d_{31})$ | 1.0 | 14.5 | ~130 | 4.3 |
| $d_{33}$ | 7.0 | 6.4 | 3.4 | 1.7 |
| $d_{22}$ | 0.5 | 5.5 | 2.9 | 1.4 |

The most commonly used coefficient is $d_{15}$, which can be birefringently phasematched for wavelengths near 1 μm. This can be seen from the long coherence length for SHG at 1.06 μm. Since this coefficient is closer to being phasematched than the other two, the coherence length is longer at other wavelengths as well, making formation of periodic domain structures of the required spacing similar for quasi-phasematching $d_{15}$.

Since $d_{33}$ is the largest coefficient, it is desirable to use it to obtain the highest conversion efficiencies. It must be quasi-phasematched since it couples waves with the same polarization; for first-order quasi-phasematching a factor of 20 in conversion efficiency is gained over birefringently phasematched $d_{15}$. (Since, as mentioned above, the efficiency goes as $1/m^2$, a third-order interaction offers a gain of 2.2.)

The coefficient $d_{22}$, is the smallest and exhibits the shortest coherence lengths for SHG. In spite of this, one may wish to use such coefficient since propagation of radiation in $LiNbO_3$ polarized $n_0$ does not suffer from photo induced refractive effects.

In one experiment utilizing quasi-phasematching in a lithium niobate crystal having oppositely polarized regions in a waveguide formed as above, input and output coupling to the same was accomplished with rutile prisms. An 8 cm focal length cylindrical lens at the input focused the beam onto the waveguide. With 1 mW of CW power at 1.06 μm measured at the output of the waveguide, 0.5 nW of 532 nm radiation was generated. Both the fundamental and harmonic waves had the proper polarization for operation using $d_{33}$. The conversion efficiency of the device was about 5% per W-cm².

The waveguide was modeled as a step-index guide with a refractive index increase of 0.003. Estimating the depth of the waveguide to be in the range of 4-7 μm, conversion efficiencies calculated to range from 7 to 10% per W-cm². (This is in reasonable agreement with the actual values obtained above.) It was calculated from these values that the observed second harmonic power is roughly 1500 times larger than what one would see if the interaction were not quasi-phasematched.

It should be noted that just as the solid state body could be of materials other than crystalline lithium niobate, the material which is diffused therein could be different. For example, other materials which may be diffused into lithium niobate to alter its composition include chromium and yttrium.

Figure 5:
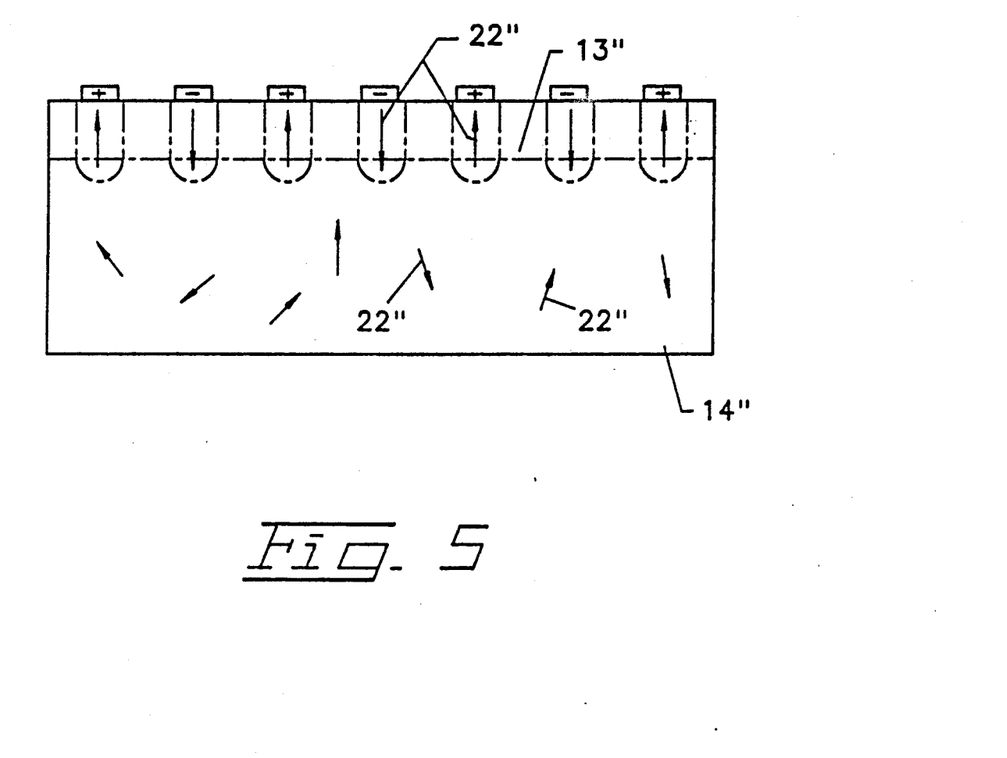
FIG. 5 is a schematic representation of electrical poling.
Figure 6:
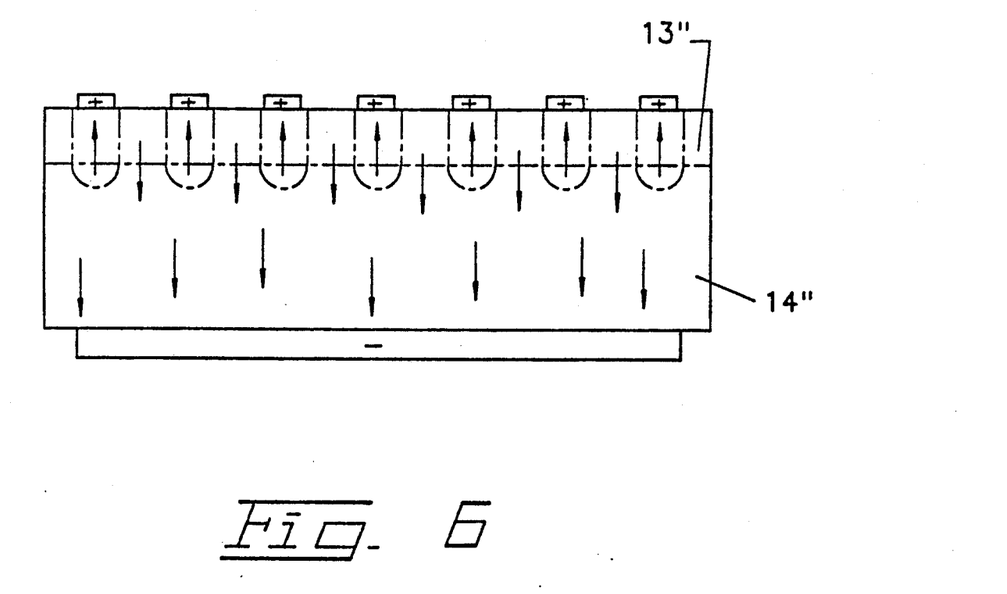
FIG. 6 is a schematic illustration of a different embodiment of electrical poling of the instant invention.

As mentioned previously, regions of desired polarization also can be achieved by applying electric fields to a solid state body to control polarization in specified regions. FIGS. 5 and 6 illustrate two approaches in which electrodes contact a solid state body to provide such regions transverse to a waveguide in the same. The body is represented in such figures by the reference numeral 14" and the waveguide is indicated at 13". In some instances, a waveguide can be omitted to allow freely propagating radiation as opposed to guided radiation to interact within a nonlinear body.

With reference to FIG. 5, electrodes are patterned on the surface of the solid state body adjacent the waveguide, to coincide with the length and spacing between the desired regions. For the formation of such regions, the body with the electrodes is heated above the Curie temperature of the same. An electric field is applied to the electrodes, with the electrodes alternating spatially between more positive and more negative potentials, while the construction is cooled to below the Curie temperature The electrodes are then removed from the body. The desired regions are thus formed, with their pattern being determined by the pattern of the electrodes It should be noted that the regions will retain their dominant polarizations as long as the body is not heated to near the Curie temperature.

In keeping with the invention, the materials of the electrodes are selected relative to the material of the solid state body and the potential intended to be applied thereto, to inhibit diffusion of the electrode materials into the body when potential is applied to the electrodes Migration of contaminating material into the waveguide is thus inhibited. The solid state body is selected to be a lithium tantalate body in view of its relatively low Curie temperature. With such a body, the electrodes to which a positive potential is to be applied is chrome with a gold covering, whereas the material of the electrodes selected to have the other potential applied thereto is gold. As indicated by the arrows 21" in FIG. 5, the solid state body within which the polarization is controlled does not have an original state of polarization. This means that the region in the waveguide adjacent each of the regions 22" has no selected dominant polarization.

FIG. 6 illustrates another approach to preventing contaminating diffusion from being present in a waveguide. In such an arrangement, all of the electrodes which define the pattern of the regions are designed for one potential, whereas the other electrode(s) designed for another potential, e.g., a more negative potential, are on a differing surface to be spaced away from the waveguide. Because of such spacing, it will be seen that migration into the waveguide of the material from the electrode on the differing surface will be minimized.

It should be noted that both of the approaches illustrated in FIGS. 5 and 6 can be used at the same time. That is, a careful selection of the materials for the electrodes can be made to inhibit migration, in addition to placement of the electrodes on differing surfaces of the solid state body to inhibit migration.

There are variations applicable to both arrangements. For example, the electric field can be applied below the Curie temperature of the solid state body and the body can be maintained below such temperature during the poling process. A periodic electric field also can be thermoelectrically generated at the surface of the body by creating a gradient of temperature variation through, for example, the interference of two laser beams at the surface of the crystal. Moreover, chemical poling and electric poling can be used together. That is, one can alter the composition of a material which may not in-of-itself result in the desired polarization and then apply an appropriate electric field to complete the polarization in the regions so defined.

The invention has been described in connection with preferred embodiments and variations thereof, in keeping with the patent laws Other variations, and modifications and changes can be made without departing from the invention. For example, it would be recognized that the chemical and electric poling of a solid state body described above is useful for many optical integrated devices, such as an optical parametric oscillators or optical parametric amplifiers, as well as for an optical generator as described It therefore is intended that the scope of the invention be defined only by the claims and their equivalents.

What is claimed is:

1. A nonlinear converter of electromagnetic radiation having a desired optical frequency, comprising:
   a body of solid state material;
   source means of electromagnetic radiation having one or more frequencies which are different than the desired optical frequency;
   waveguide means provided by said body for confining electromagnetic radiation;
   means for directing electromagnetic radiation from said source means into said waveguide means; and
   said waveguide means having a plurality of succeeding regions of differing compositions respectively providing differing states of dominant electrical polarization in succeeding regions transverse to the path of radiation guided by the same for converting radiation from said source means to output radiation having said desired optical frequency.

2. The nonlinear converter of claim 1 wherein said source and output electromagnetic radiation are coherent, and said regions have lengths selected to provide quasi-phasematching between said source radiation and said output radiation.

3. The nonlinear converter of claim 1 wherein said body is formed of a ferroelectric material and said waveguide is formed therein.

4. The nonlinear converter of claim 1 wherein said waveguide means is a waveguide channel defined within said body.

5. The nonlinear converter of claim 1 wherein each of said regions is generally equal in length to an odd integer multiple of the coherence length of the nonlinear interaction.

6. The nonlinear converter of claim 1 wherein said desired optical frequency is the second harmonic of the frequency of radiation provided by said source means.

7. The nonlinear converter of claim 6 wherein said radiation of said desired optical frequency has a wavelength in the range of about 390–492-nanometers.

* * * * *

UNITED STATES PATENT AND TRADEMARK OFFICE
CERTIFICATE OF CORRECTION

PATENT NO. : 5,036,220
DATED : July 30, 1991
INVENTOR(S) : Byer et al.

It is certified that error appears in the above—identified patent and that said Letters Patent is hereby corrected as shown below:

Column 2 of the title page, line 27, "Lug, et al." should be replaced by --Luh, et al.--, and the following should be added to the list of OTHER PUBLICATIONS:

--Miyazawa, Shintaro, "Ferroelectric domain inversion in Ti-diffused $LiNbO_3$ optical waveguide", J. Appl. Phys. 50(7), July 1979, pp. 4599-4603.--

Signed and Sealed this

Eleventh Day of April, 1995

*Attest:*

BRUCE LEHMAN

*Attesting Officer*  *Commissioner of Patents and Trademarks*

REEXAMINATION CERTIFICATE (2729th)

United States Patent [19]

Byer et al.

[11] B1 5,036,220

[45] Certificate Issued Nov. 14, 1995

[54] NONLINEAR OPTICAL RADIATION GENERATOR AND METHOD OF CONTROLLING REGIONS OF FERROELECTRIC POLARIZATION DOMAINS IN SOLID STATE BODIES

[75] Inventors: Robert L. Byer, Stanford; Martin M. Fejer; Eric J. Lim, both of Menlo Park, all of Calif.

[73] Assignee: Leland Stanford Junior University, Stanford, Calif.

Reexamination Request:
No. 90/003,145, Jul. 29, 1993

Reexamination Certificate for:
Patent No.: 5,036,220
Issued: Jul. 30, 1991
Appl. No.: 511,547
Filed: Apr. 20, 1990

Related U.S. Application Data

[62] Division of Ser. No. 305,215, Feb. 1, 1989.

[51] Int. Cl.⁶ ........................................... H03F 7/00
[52] U.S. Cl. ................... 359/328; 359/326; 372/22; 385/122
[58] Field of Search ................... 359/326–332; 385/1–3, 14, 122, 132, 31, 33, 38; 372/7, 21, 22

[56] References Cited

U.S. PATENT DOCUMENTS 3,842,289 10/1974 Yariv et al. ........................ 359/332
4,904,038  2/1990 Chang ............................ 359/326 X

OTHER PUBLICATIONS

G. I. Stegeman et al., *Appl. Phys.*, 58(12):R57–R78 (Dec. 1985).

S. Miyazawa, *J. Appl. Phys.*, 50(7):4599–4603 (Jul. 1979).

B. Jaskorzynska et al., *Integrated Optical Cir. Eng. III*, SPIE 651:221–228 (1986). (Month not available).

G. Tohmon et al., *Miniature Optics and Lasers*, SPIE, 898:70–75 (1988). (Month not available).

D. Feng et al., *Appl. Phys. Lett.*, 37(7):607–609 (Oct. 1980).

Dewey, et al., "Enhanced nonlinear optical effects in rotationally twinned crystals", Appl. Phys. Lett., vol. 26, No. 8, 15 Apr. 1975, pp. 442–444.

Somekh, et al., "Phase matching by periodic modulation of the nonlinear optical properties", Optics Communications, vol. 6, No. 3, Nov. 1972, pp, 301–304.

Armstrong, et al., "Interactions between Light Waves in a Nonlinear Dielectric", Phys. Rev., vol. 127, No. 6, Sep. 15, 1962, pp. 1918–1939.

Feng, et al., "Enhancement of Second–Harmonic Generation in $LiNbO_3$ Crystals With Periodic Laminar Ferroelectric Domains", Appl. Phys. Lett 37(7) 1 Oct. 1980, pp. 607–609.

Luh, et al., "Stoichiometric $LiNbO_3$ Single–Crystal Fibers for Nonlinear Optical Applications", J. Crystal Growth 85 (1987), pp. 264–269.

Suchoski, et al., "Stable Low–Loss Proton–Exchanged $LiNbO_3$ Waveguide Devices With No Electro–Optic Degradation", Optics Letters, vol. 13, No. 11 (Nov. 1988), pp. 1050–1052.

Miyazawa, Shintaro, "Ferroelectric Domain Inversion in Ti–Diffused $LiNbO_3$ Optical Waveguide", J. Appl. Phys. 50(7), Jul. 1979, pp. 4599–4603.

*Primary Examiner*—Frank Gonzalez

[57] ABSTRACT

A nonlinear waveguiding optical converter in a solid state body. The waveguide is provided with compositionally differing region (domains) of dominant electrical polarization in succeeding regions transverse to the path of guided radiation.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, line 38 to column 2, line 6:

The nonlinear converter includes, from the broad standpoint, a source of electromagnetic radiation having one or more frequencies which are different than the desired optical frequency, and a solid state body within or upon which a waveguide is defined for confining electromagnetic radiation from the source and/or electromagnetic radiation having the desired frequency. In keeping with the invention, the waveguide is provided with two or more regions (domains) of different states of ferroelectric polarization transverse to the path of the radiation guided by the same, so as to convert the radiation from the source to output radiation having the desired optical frequency. (As used herein, a state, domain, or region of ferroelectric polarization is meant to be a state, domain, or region in which there is a direction of ferroelectric polarization that is dominant over others. *This phenomenon often is referred to in the art as "spontaneous" polarization.* The term "optical" as used herein to identify EM radiation or EM radiation properties, is meant to define and encompass electromagnetic radiation in the visible wavelength spectrum and in other adjacent wavelength spectrums,—typically radiation having a wavelength in the range of between 1 and 15,000 nanometers.)

Most desirably, each of the regions has a length along the path which provides quasi-phasematching (QPM) between the source radiation and the generated radiation. It has been found that quasi-phasematching can provide nonlinear conversion of EM radiation relatively efficiently to a desired optical wavelength in certain situations. For example, use of quasi-phasematching enables one to take advantage of nonlinear coefficients which are not available for use with birefringent phasematching. In some situations [II], it also enables one to obtain desired operating temperatures, to increase bandwidth, or even to obtain nonlinear conversion with many materials with which birefringent phasematching is not practiced.

Column 10, from line 3 to line 17:

With reference to FIG. 5, electrodes are patterned on the surface of the solid state body adjacent the waveguide, to coincide with the length and spacing between the desired regions. For the formation of such regions, the body with the electrodes is heated above the Curie temperature of the same. An electric field is applied to the electrodes, with the electrodes alternating spatially between more positive and more negative potentials, while the construction is cooled to below the Curie temperature. The electrodes are then removed from the body. The desired regions are thus formed, with their pattern being determined by the pattern of the electrodes. It should be noted that the regions will retain their dominant polarizations as long as the body is not heated to near the Curie temperature.

AS A RESULT OF REEXAMINATION, IT HAS BEEN DETERMINED THAT:

Claim 3 is cancelled.

Claim 1 is determined to be patentable as amended.

Claims 2 and 4–7, dependent on an amended claim, are determined to be patentable.

New claims 8–13 are added and determined to be patentable.

1. A nonlinear converter of electromagnetic radiation having a desired optical frequency, comprising:
   a body of solid state *ferroelectric* material;
   source means of electromagnetic radiation having one or more frequencies which are different than the desired optical frequency;
   waveguide means [provided by] *formed on or in* said body for confining electromagnetic radiation;
   means for directing electromagnetic radiation from said source means into said waveguide means; and
   said waveguide means having a plurality of succeeding regions of differing compositions respectively providing differing states of [dominant electrical] *spontaneous* polarization in succeeding regions transverse to the path of radiation guided by the same for converting radiation from said source means to output radiation having said desired optical frequency.

8. *The nonlinear converter of claim 1 wherein said means for directing electromagnetic radiation includes an optical fiber.*

9. *The nonlinear converter of claim 1 wherein said means for directing electromagnetic radiation includes a focusing lens.*

10. *The nonlinear converter of claim 1, claim 8, or claim 9 wherein said source means is a laser diode.*

11. *A nonlinear converter of electromagnetic radiation having a desired optical frequency, comprising:*
    *a body of lithium niobate;*
    *source means of electromagnetic radiation having one or more frequencies which are different than the desired optical frequency;*
    *means for directing electromagnetic radiation from said source means into said body; and*
    *said body having a plurality of succeeding regions of differing compositions respectively providing differing states of spontaneous polarization in succeeding regions transverse to the path of radiation in the same for converting radiation from said source means to output radiation having said desired optical frequency.*

12. *The nonlinear converter of claim 11 wherein said plurality of succeeding regions of differing compositions are provided by regions of lithium niobate and titanium separated by regions of lithium niobate.*

13. *The nonlinear converter of claim 11 wherein said waveguide means is a waveguide channel defined within said body at a surface thereof.*

\* \* \* \* \*